Sept. 3, 1957 G. T. BAKER 2,805,286
ELECTRICAL SIGNALLING SYSTEMS
Filed July 23, 1952 6 Sheets-Sheet 1

Sept. 3, 1957     G. T. BAKER     2,805,286
ELECTRICAL SIGNALLING SYSTEMS
Filed July 23, 1952     6 Sheets-Sheet 6

A = LOOP CHANGES FROM CLOSED TO OPEN

B = LOOP REMAINS OPEN

C = LOOP REMAINS CLOSED

D = LOOP CHANGES FROM OPEN TO CLOSED

United States Patent Office 2,805,286
Patented Sept. 3, 1957

2,805,286

ELECTRICAL SIGNALLING SYSTEMS

George Thomas Baker, Taplow, England, assignor to British Telecommunications Research Limited, Taplow, England, a British company Application July 23, 1952, Serial No. 300,431

Claims priority, application Great Britain July 25, 1951

12 Claims. (Cl. 179—18)

The present invention concerns improvements in or relating to telephone or like signalling systems and is more particularly concerned with arrangements for storing on a high-speed register device trains of impulses such as might be dialled by a calling subscriber. The expression high speed register device is intended to apply particularly to a so-called magnetic drum in which information is stored by the selective magnetisation of small areas on a circumferential track which co-operates with a reading head and a writing head. Though the cylindrical formation is probably most convenient in practice the term "magnetic drum" is intended to include also a disc or endless tape operating on the same principle. Such a device affords the facility of very rapid storage and also the capacity to store a large amount of information in a small compass so that a magnetic drum of reasonable dimensions operating on a time division basis may be used for dealing with all the subscribers in an exchange.

According to the invention, a telephone system in which calling signals in the form of trains of impulses transmitted over a line by the intermittent interruption thereof are registered on a high-speed register device of the magnetic drum type comprising a continuously-moving magnetic surface co-operating with reading and writing heads includes arrangements for testing the open or closed condition of a line at suitable regular intervals, means for comparing the results of successive tests and means for adding one unit to the registration on the register device each time a change of condition of the line in one direction (e. g. closed to open) is detected but not when the opposite change (e. g. open to closed) is detected.

The invention will be better understood from the following description of a preferred method of carrying it into effect which should be taken in conjunction with the accompanying drawings comprising Figs. 1 to 8. Of these Fig. 1 is a schematic drawing showing the principles of the regenerative loop method of working and the way signals are applied and erased.

Figure 6:
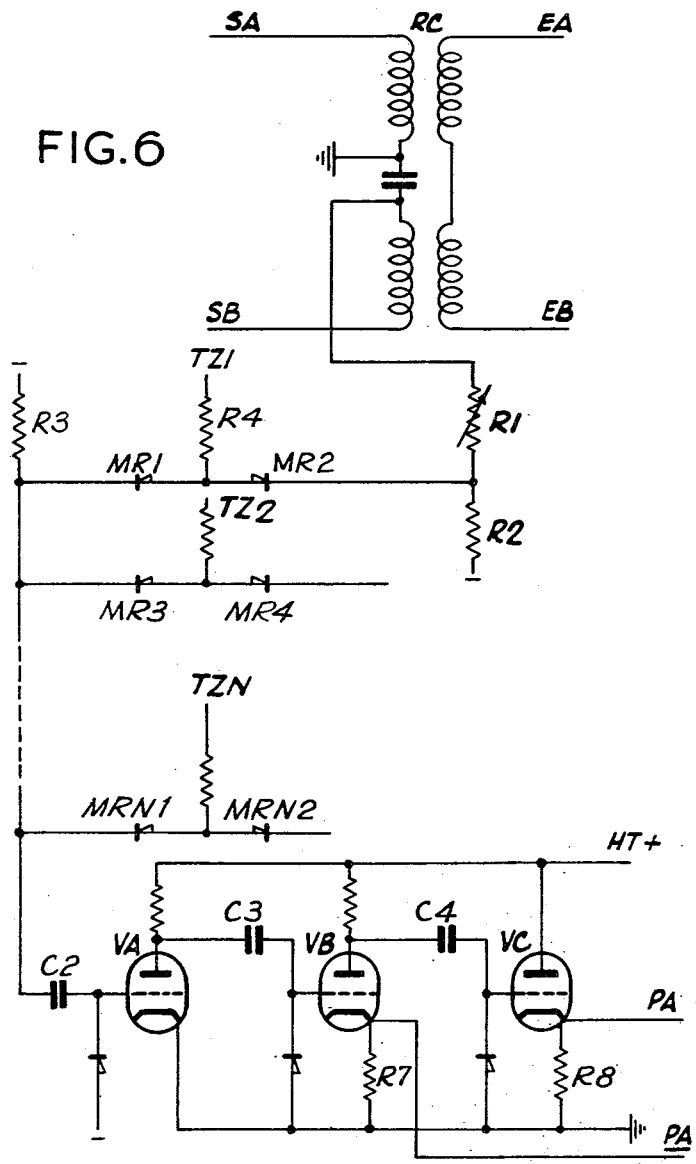
Figure 7:
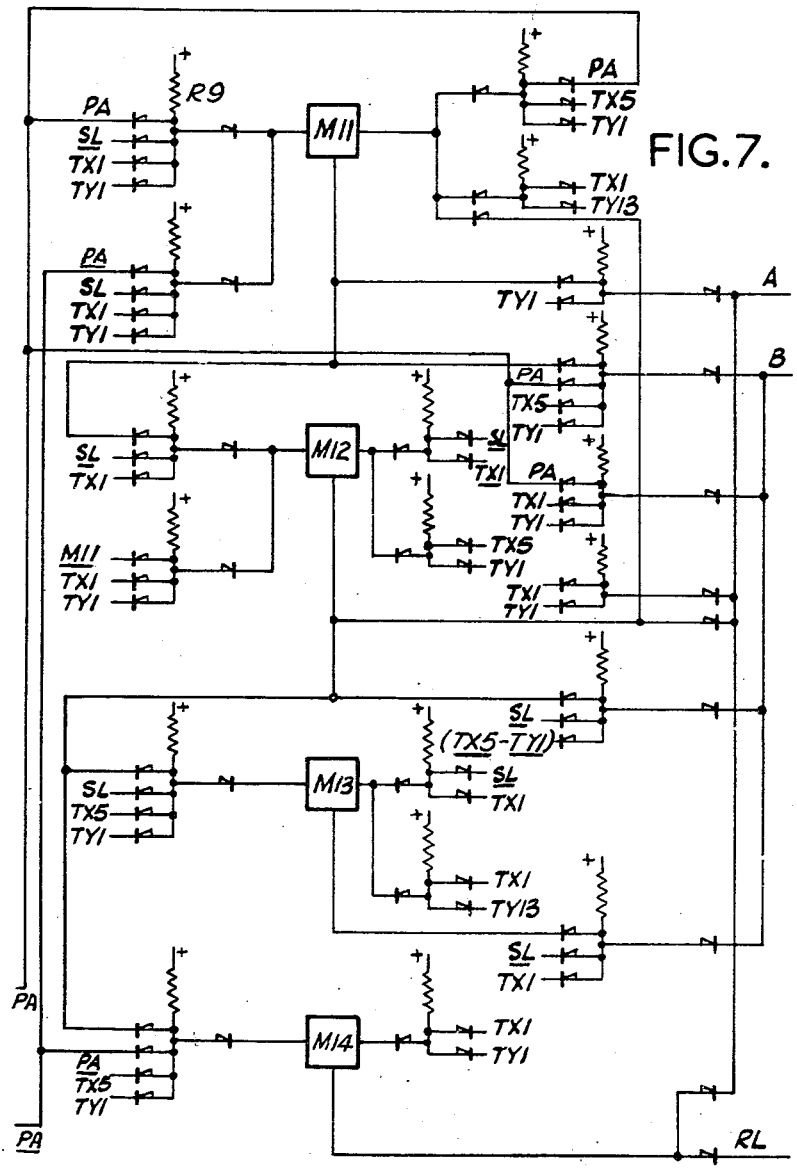
Figure 8:
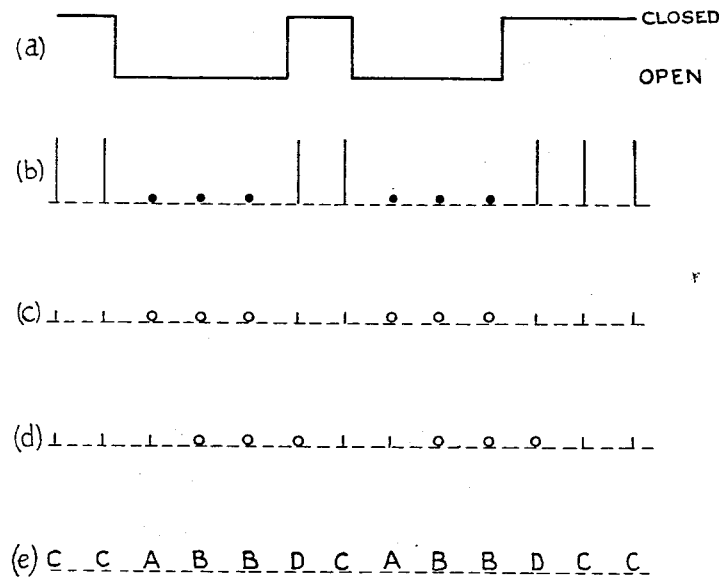

Fig. 6 shows possible connections to a subscriber's line whereby outputs designated PA and $\overline{PA}$ are obtained, there being positive on PA when the line in question is closed and positive on $\overline{PA}$ when it is open. Fig. 7 shows the various circuits whereby suitable connections are made to leads A and B at the appropriate instants in order to set up the required marking and/or derive the necessary control therefrom. Lead RL is intended to extend to suitable switching equipment so as to bring about the release of the connection when potential is applied thereto. Fig. 8 is intended to indicate more clearly the principle on which the invention is based. The showing is however somewhat schematic and it will be understood that use is made of so-called memory circuits each comprising a toggle circuit of modified Eccles-Jordan type. The full circuit of such a toggle is shown in my copending application Serial No. 300,429, filed July 23, 1952. This also shows the full circuit for a magnetic drum of the type in question and explains in detail how the application of a pulse to lead B effects the storage of a 1 while the application of a pulse to lead A effects the storage of a 0. Lead SL is the sampling lead and potential is connected thereto when the reading head encounters a stored 1. Lead SL carries the inverse of the signals on lead SL, that is to say, potential is connected to lead $\overline{SL}$ when the reading head encounters 0 on the storage. The drum is assumed to be provided with a number of tracks extending round its circumference each track catering for a plurality of complete subscribers' numbers.

Considering now the detailed operation, sufficient description will first be given to make clear the general working of the magnetic drum storage device with the control circuits which are assumed to be employed.

Figure 1:
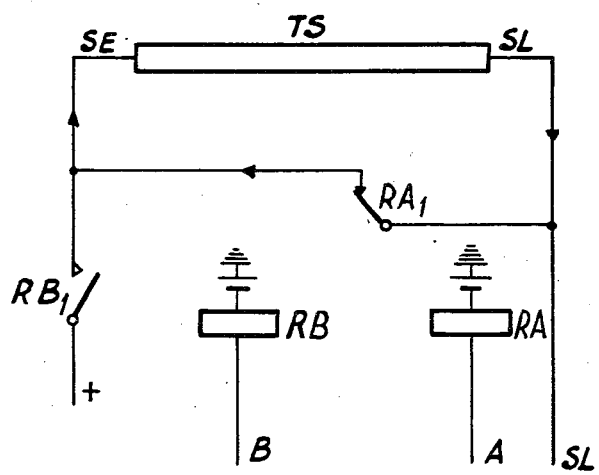

In the diagram of Fig. 1, TS represents the storage device which is assumed to operate so that the stored signals may be thought of as passing through the storage device from the left to the right and round the regenerative loop as indicated by the arrows. With no connections made to either lead A or lead B, the regenerative loop is effective and signals picked up by the reading head and appearing as output SL pass back as input SE to the writing head, after suitable amplification and with the appropriate time adjustment. Accordingly as long as the equipment is in operation on this basis, signals which have once been recorded will remain, since they are regenerated on each revolution of the drum. If, however, earth is connected to lead A so as to operate relay RA, the regenerative loop is broken at contacts RA1 and the signals which come in question during the time relay RA remains operated will therefore be erased. Similarly if earth is connected to lead B so as to operate relay RB, signals represented by positive potential are fed into the drum during the period that relay RB remains operated. If relays RA and RB are operated together, the action of relay RB is effective since contacts RB1 feed into the regenerative loop on the input side of contacts RA1. Lead SL permits the stored information to be sampled since it bears specimens of the various signals as they are encountered successively.

Figure 2:
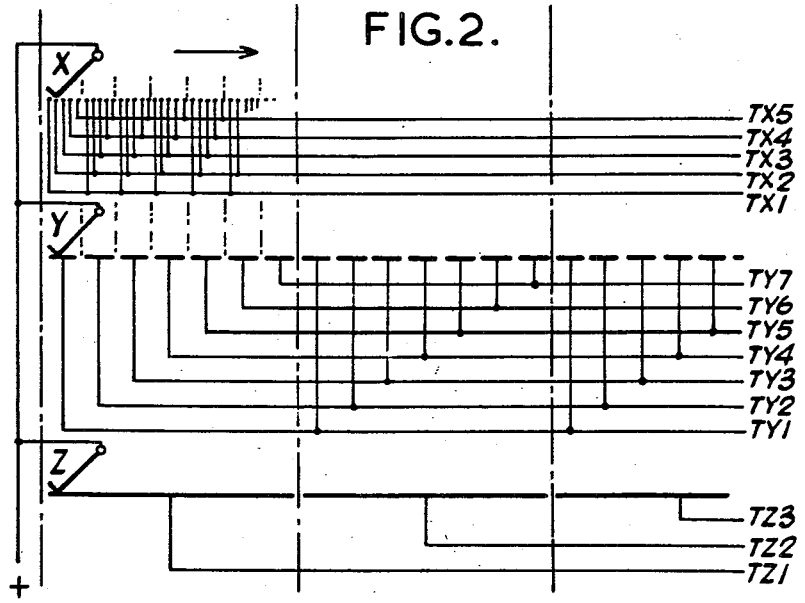
Fig. 2 shows diagrammatically the relationship of the so-called clock or time pulses which control the scanning operations and may in practice be obtained from an auxiliary track on the drum or from a mechanical switching device.

Fig. 2 indicates diagrammatically a possible arrangement which could be used for the production of so-called clock or time pulses and it is intended to represent the development of a portion of a contact drum which is assumed to move at constant speed towards the left. Three rows of contacts are provided on this drum of which the individual contacts associated with leads TZ1, TZ2 . . . cover the same distance as seven of the contacts occupies a distance equivalent to five of the contacts associated with leads TY1 . . . TY7 while each of the contacts associated with leads TX1 . . . TX5. It will be understood that these contacts are repeated over the whole circumference of the switching drum for the appropriate number of TZ groups though only sufficient are shown to indicate the general arrangement. It will be appreciated that if the drum is driven at constant speed, positive potential will be connected over brush X to leads TX1 . . . TX5 in turn and that during successive X cycles connection will be made over brush Y to leads TY1 . . . TY7 in turn and that throughout a complete cycle of the Y contacts connection is made over brush Z to one of the TZ leads. The significance of this arrangement will appear as the description proceeds but it may be mentioned that the Z contacts are individual to particular pieces of equipment for instance a subscriber's line forming a group of registering space on the magnetic drum, each Y contact corresponds to a registering block while the X contacts correspond to the individual areas of the block. It should be explained that the showing is only intended to be diagrammatic and does not represent the mechanical details of the arrangement which would be used.

Figure 3:
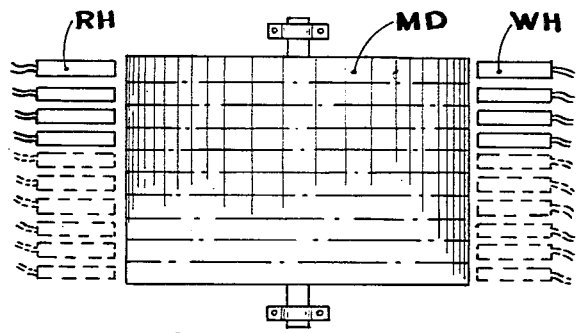
Fig. 3 is a side elevation of the drum and indicates generally the co-operation of the different tracks with the various reading and writing heads.

Considering now Fig. 3 which is intended to be a plan view, in the form shown in this figure the drum MD is mounted with its axis horizontal and the driving arrangements including an electric motor and an eddy current brake are located inside. The magnetic surface on which storage takes place may comprise a thin layer of nickel plating and the reading and writing heads RH and WH respectively, which are identical, are conveniently mounted in an axial line 180° apart. Clearly if full use is to be made of the storage capacity of the drum, the tracks must be located as close together as possible but it is difficult to keep the axial dimension of a reading or writing head to the width of the associated track. Hence it may be desirable from considerations of physical spacing to stagger the reading and writing heads by arranging them in two lines offset by half the width of the track. The 180° angular relationship suggested above between the reading and writing heads associated with a particular track is a convenient one and means that the same stored information is recorded on each half of the circumference of the drum. Alternatively the reading and writing heads may be displaced by an angle sufficient to give adequate separation, say 15°, in which case the remainder of the circumference is available for storage purposes but any particular signal will appear in a different position on the drum during successive revolutions.

Figure 4:
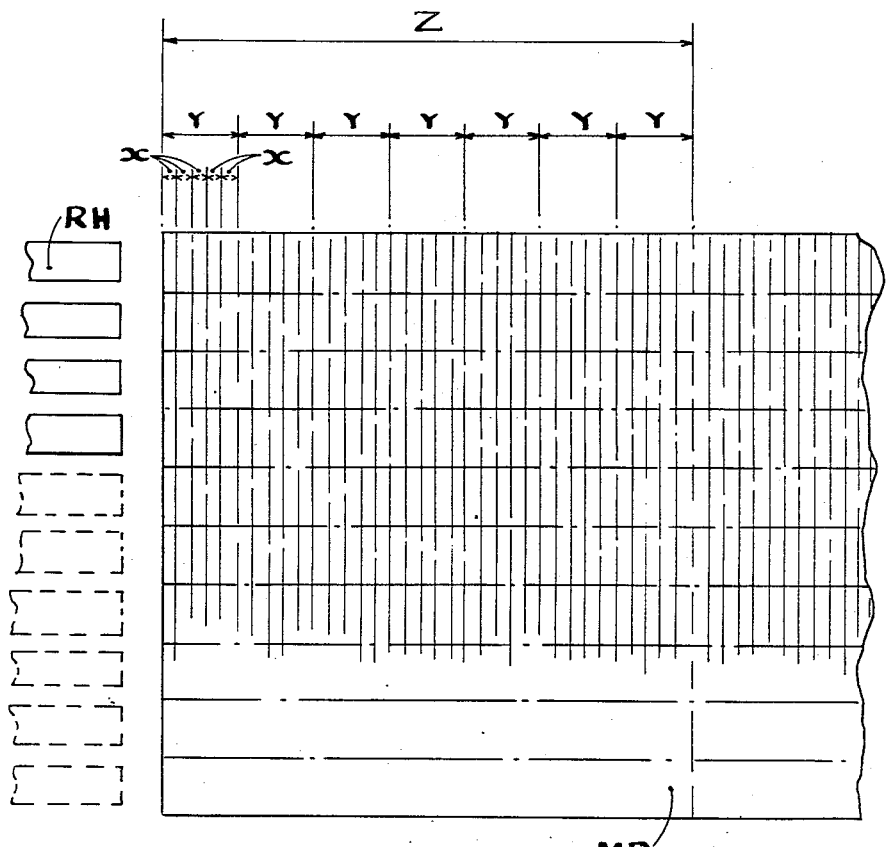
Fig. 4 represents a development of a portion of the drum surface so as to show on a larger scale the unit storage areas and their relationship to the time pulse systems indicated in Fig. 2.

In the showing of Fig. 4 it has been assumed that there is a single row of writing heads which are shown on the left. The arrangement of Fig. 4 is intended to indicate more clearly the grouping of the various storage areas and it will be noted that this corresponds closely with the arrangement for producing time pulses as shown in Fig. 2. Five unit areas are considered to form a block, the first unit area being used for control purposes while the remaining four serve for binary storage of a digit which may have any value from 0 to 9. Such a block is used for each digit to be dealt with and as shown seven blocks form a group which is associated with an individual signal source and this forms a Z unit, corresponding to one TZ pulse. Similarly the TY pulse corresponds to an individual block and the TX pulse to a unit storage area. Though in both Figs. 2 and 4, seven blocks are shown as forming a group in order to keep the figures within bounds, thirteen blocks are assumed to form a group in the detailed circuits about to be described and the first block which is encountered by the reading head in the direction of rotation is a so-called instruction block, which is reserved for control purposes while the second-thirteenth blocks serve for the storage of twelve digits. The number of Z groups provided on a complete track is quite arbitrary and will be determined by the physical size of the drum, its speed of operation and the number of digits involved but 20 is a suitable figure.

Figure 5:
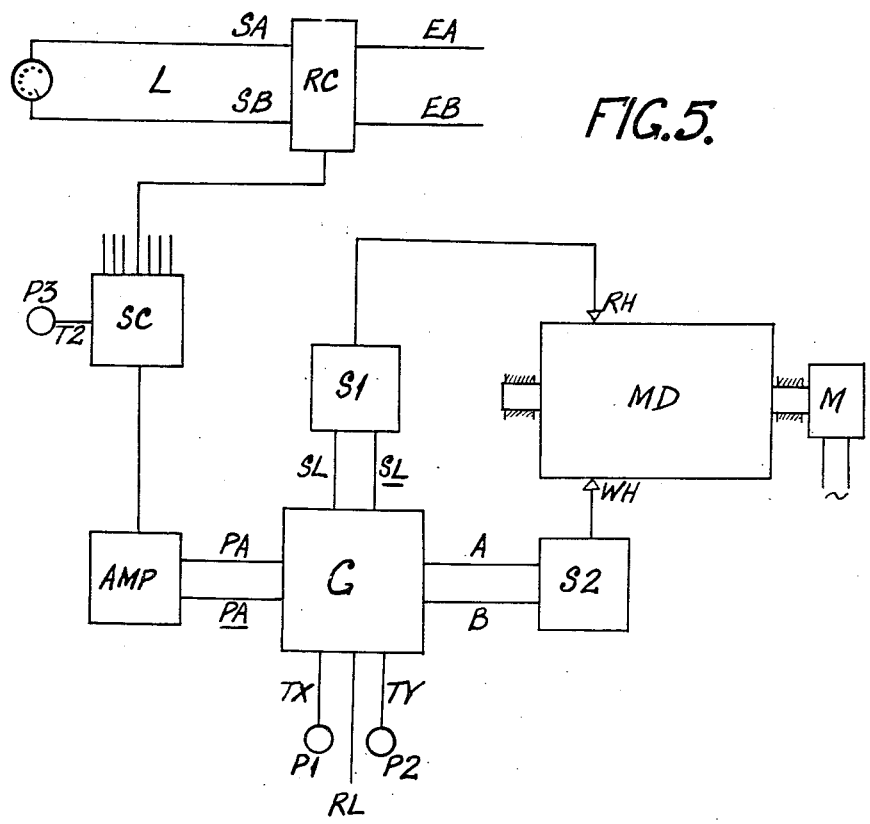
Fig. 5 shows in schematic form the general layout of the equipment according to the invention.

Referring now to Fig. 5, this shows a signalling line SL assumed to be a telephone line terminating at one end in an impulse sending device shown as a telephone subscriber's dial switch. This line extends to the repeating coil RC at the exchange where the remainder of the equipment is located. MD indicates a magnetic drum driven by an electric motor M and the recording track which is assumed to be concerned as shown as a dotted line defined by the reading head RH and the writing head WH. The line SL with its associated repeating coil RC is one of a plurality which are connected in turn to the drum equipment by the scanner SC which is controlled by the pulse source P3 producing TZ pulses. The output from the scanner is passed to an amplifier AMP which provides the output PA and the reverse output $\overline{PA}$. These are supplied to the control equipment generally indicated by the reference G containing a number of gate circuits. The output from the reading head RH is fed to sampler S1 giving an output SL when the registration of a 1 is encountered and an output $\overline{SL}$ when the registration of a 0 is encountered. The writing head WH is controlled by sampler S2 to which potential is fed over the leads A and B, the arrangement being as previously described that if potential is connected to lead A a 0 is registered on the drum while if potential is connected to lead B a 1 is registered on the drum. If potential is connected to both leads simultaneously, the effect of the B lead preponderates and a 1 is written. The equipment is also supplied with pulses from the source P1 and P2, P1 providing TX pulses and P2 providing TY pulses. The equipment is also arranged to connect potential to lead RL to effect release of any operated equipment in certain circumstances.

Dealing first with Fig. 8, this shows in line (a) the changes which take place in the subscriber's loop during a train of two impulses, the time base extending horizontally. In order to ensure that any significant change in the condition of the subscriber's line is detected, it is necessary to effect a scanning operation at a speed such that the interval between successive tests is appreciably less than the expected interval between successive changes. With the design and adjustment of dial switches usually employed, the shortest such period is the make period of an impulse which in a system in perfect condition lasts for 33⅓ m. secs. In order to allow for loss of adjustment and distortion, however, it is desirable to reduce this period appreciably and in the system about to be described a period of 16⅔ m. secs. has been chosen which is the time of one cycle of the drum, that is to say one revolution assuming that only a single reading and writing head per track is employed.

The marking in row (b) indicate the current flow over the loop during successive scanning periods and row (c) indicates how these conditions would be recorded on the drum as 0's or 1's. Row (d) indicates the state of affairs on the previous scan. It will now be appreciated that on comparing the results of successive scans four different conditions are possible and for convenience these will be referred to as A, B, C and D. A is the case in which between successive scans the condition of the loop is changed from closed to open thus representing the beginning of an impulse or the fact that the subscriber has hung up. B is the condition in which the loop remains open throughout the interscan period. C is the case in which the loop remains closed for this period and D is the case in which the condition of the loop changes from open to closed indicating the end of an impulse or the initial closure of the loop when a subscriber initiates a call. Row (e) indicates the various conditions corresponding to states (c) and (d) in successive scans.

The general principle of operation is that when the circuits of Fig. 7 detect the opening of the loop, i. e. condition A, an impulse is written into the register device and a timing operation is initiated which determines whether this is in fact an impulse or the abandonment of the call. This timing operation continues as long as the loop remains open and if this condition B (loop remains open) is not changed to condition D in a period representing the maximum tolerable break period, the connection is released. If however the loop is again closed, the timing and counting which has also taken place is cancelled and is restarted in order to time the closed period. This is necessary in order to determine whether the impulse just received is the last one of a train, and if it is, changes are necessary to ensure that the following impulses shall be registered in a different block.

Referring now to the detailed circuits of Figs. 6 and 7, Fig. 1 shows the exchange termination of a subscriber's line, the leads SA and SB extending to the substation while the leads EA and EB from the other winding of the repeating coil RC connect the speaking circuit to the automatic switches over which the connection is set up. The control from the drum for effecting the setting of these switches is not shown but may be as disclosed in my co-pending application Ser. No. 300,430 filed in the name of George T. Baker et al. on July 23, 1953 for Electrical Signalling Systems. The circuit extending over the subscriber's loop includes in addition to the windings of the repeating coil the resistors R1 and R2 of which R1 is adjustable to allow for different subscriber's line conditions. When the subscriber's line is closed by completing a direct current path in the telephone instrument across leads SA and SB, the potential at the junction of resistors R1 and R2 is rendered more positive due to current flow over the subscriber's loop and this change is employed for controlling registration on the drum. The line shown is assumed to correspond to the first of the various Z groups and is therefore connected to the common equipment under the control of pulse lead TZ1. The pulse leads TZ1, TZ2 . . . TZN have positive potential connected to them in turn and as shown in Fig. 2. The rectifiers MR1, MR2 . . . MRN1, MRN2 operate to form gate circuits and ensure that a positive pulse shall only be connected to common capacitor C2 if positive is applied to the right-hand rectifier from the associated subscriber's line and also positive is connected up by way of the associated TZ lead. It will be seen that as regards the first line, no current flow will take place in the circuit R3, MR1, R4, MR2, R2 in the absence of the TZ1 pulse. When this is present, current flows over R4, MR2 and R2 and a very much smaller current flows over R4, MR1 and R3 so that there is no significant change in the potential at the junction of resistor R3 and rectifier MR1. If the potential at the junction of R1 and R2 has been raised however due to the looping of the line, most of the current flow through resistor R4 traverses resistor R3 and accordingly capacitor C2 is charged. Thus the inputs from the subscriber's lines are connected to the common equipment in succession.

This equipment comprises the three valves VA, VB and VC connected in tandem in such manner that lead PA connected to the cathode of valve VC will be more positive when the subscriber's loop then associated therewith is closed, while the lead PA connected to the cathode of valve VB will be more positive when the loop is open. When capacitor C2 is positively charged, valve VA becomes conductive and hence the anode potential falls due to current flow through the load resistor R5. Thereupon capacitor C3 is charged negatively and valve VB is cut off so that its anode potential rises due to the cessation of current flow through resistor R6. Accordingly capacitor C4 is positively charged and valve VC becomes conductive whereupon the potential of its cathode rises due to current flow through cathode resistor R8. Hence the original positive pulse applied to capacitor C2 results in an amplified positive pulse being applied to lead PA. Lead PA is connected to the cathode of valve VB and hence the potential of PA is raised due to the flow of current through cathode resistor R7 when VB is conducting which at the time that VC is cut off and hence there is no positive potential on lead PA. The manner in which the state of leads PA and PA influences the drum will be better appreciated from reference to Fig. 7.

Referring now to this figure, this involves the use of four so-called memory circuits M11–M14 which as previously mentioned are conveniently in the form of pairs of valves having their grids and anodes cross-connected so as to have two stable positions. When a positive pulse is applied to a memory circuit from the left-hand side, it changes over to its other position and applies a positive pulse to the lead extending vertically downwards. It is restored to its previous condition by a positive pulse applied from the right-hand side. The circuit of Fig. 7 also shows the use of a number of so-called coincidence circuits which operate on the basis that a pulse is only applied to the element to be controlled such as a memory circuit if positive potential is applied simultaneously through the rectifiers from all the input circuits concerned. If this is not the case (considering the circuit in the top left-hand corner of Fig. 7) there will be current flow through resistor R9 over the lead or leads PA, SL, TX1, TY1 at lower potential and hence the potential of the lead to be controlled cannot rise to the potential of the source.

It will be seen that as long as the particular loop concerned remains open, memory circuit M11 remains in the reset condition. When the loop is closed, the coincidence circuit PA, TX1, TY1 will apply potential to lead B and thus write a dot in the first position of the instruction block which is otherwise maintained in the 0 or blank condition by the coincidence circuit TX1, TY1 applying potential to lead A. Hence the first position of the instruction block records the condition of the loop, there being a 1 or dot as long as the loop is closed, subject of course to there having been time for a scan to take place to bring this about.

It will now be seen that memory circuit M11 is operated if a change in the condition of the loop has occurred in either direction at the moment of sampling which is when the first position of the instruction block is associated with the reading head. Thus if the change is from open to closed as on the initiation of a call, there will be positive on PA but since the closed condition has not yet been registered, the storage area in question will be in the 0 or blank condition so that there is positive on SL. A similar result is brought about by coincidence circuit PA, SL, TX1, TY1 if the change is from closed to open condition. The operation of M11 causes potential to be applied to lead A over M11, TY1 for the remainder of the instruction block so as to erase any timing registrations already stored in positions 2–4 as will be explained subsequently but if the loop is now closed, a registration is made in the fifth area of the instruction block due to potential applied to lead B over coincidence circuit M11, PA, TX5, TY1. Moreover since the loop is now closed, a registration has also been made in the first area of the instruction block. Memory circuit M11 is reset at the end of the instruction block over coincidence circuit PA, TX5, TY1 since no further operation is desired at this time.

As long as no further change takes place, that is to say until the subscriber starts to dial or hangs up, memory circuit M11 will not again be operated, but memory circuit M12 will be operated over the coincidence circuit M11, TX1, TY1 at the beginning of the next scan of the instruction block. Memory circuit M12 when operated applies potential to lead A and one effect of this at this time is to cancel the registration in position 5. The registration in position 1 of the instruction block is maintained over the coincidence circuit PA, TX1, TY1 as previously described. The combined effect of the direct connection of potential to lead A and the connection of potential to lead B by way of coincidence circuit M12, SL, (TX5.TY1) is to cause the registrations in positions 2, 3 and 4 of the instruction block to be successively reversed. This continues until a 0 has been changed to a 1 whereupon memory circuit M12 is reset over the coincidence circuit SL, TX1. This process it will be appreciated constitutes the addition of one unit to the registration in areas 2, 3 and 4 and is repeated on each scan. When all three positions have 1's registered therein, i. e. a count of 7, the succeeding scan will change them all to 0's and a 1 cannot be written into position 5 by the coincidence circuit (TX5.TY1). In this case M12 is reset over TX5, TY1. The process is then repeated as long as the conditions remain the same and though this counting operation serves no useful purpose at this time, it is not objectionable.

When the loop is opened, memory circuit M11 is again operated and all registrations in the instruction block are wiped out since coincidence circuits PA, TX1, TY1 and M11, PA, TX5, TY1 are not now operative. A further effect of the operation of M11 is that a test is made by way of coincidence circuit M11, SL, TX1 for the next block which has no registration in the first area position, which is used for marking. In the circumstances assumed of a call just initiated, this will be the second block, i. e. the first digit block, and when it is reached, memory circuit M12 is operated and this then adds 1 to the registration already contained in this block which in respect of the first impulse of the series will of course be zero. The process of adding 1 is effected as just described for the instruction block by reversing the existing conditions in the successive storage areas until a point is reached at which 0 has been altered to 1 whereupon M12 is reset over SL, TX1 and no further change occurs until the next scan. Reversal of conditions is effected by the direct application of potential from memory circuit M12 to lead A and by the application of potential to lead B over coincidence circuit M12, SL, (TX5.TY1) and in the conditions assumed this will mean only altering 0 to 1 in the second position of the block whereupon M12 is reset by the coincidence circuit SL, TX1. Memory circuit M11 is reset on the operation of memory circuit M12.

If the loop is still open on the next scan, i. e. condition C, memory circuit M11 is not operated but memory circuit M12 is again operated, on this occasion from the coincidence circuit M11, TX1, TY1. In these circumstances it adds one unit to the registration in the areas 2, 3 and 4 of the instruction block as previously described. This process is repeated each scan as long as the conditions remain unchanged.

Assume first that a train of impulses is being transmitted, so that before the counting process in the instruction block has proceeded to its limit there will be another change in the state of the loop, i. e. open to closed or condition D. As a result, memory circuit M11 is again operated over PA, SL, TX1, TY1 and hence potential applied to lead A over M11, TY1 tends to erase all registrations in the instruction block. However potential is also applied to lead B over M11, PA, TX5, TY1 and over PA, TX1, TY1 and the result is therefore that registrations are again made in the first and fifth areas of the instruction block while the second to fourth areas are cleared, that is to say, the timing registrations are wiped out. Memory circuit M11 is reset at the end of the scan of the instruction block and accordingly memory circuit M13 is not operated on this scan. On the succeeding scan however, memory circuit M12 is operated over M11, TX1, TY1 and thereupon erases the registration in the fifth area of the instruction block and starts a timing count in areas 2–4. If conditions remain unchanged for several succeeding scans as is to be expected, memory circuit M12 is operated in the same manner and on each occasion adds one unit to the timing count.

When the loop is again opened at the beginning of the next impulse, i. e. condition A, memory circuit M11 again operates and wipes out all the registrations in the instruction block including the timing count. Since the digit block in which partial registration has taken place is still not marked busy by a registration in its first area, memory circuit M12 is operated over M11, SL, TX1 when the reading head encounters this block and accordingly a further unit is added to the existing registration therein. On the subsequent scan, memory circuit M11 is not operated but memory circuit M12 is now operated over M11, TX1, TY1 and as a result timing is initiated by successive registrations in areas 2–4 of the instruction block.

This general sequence of operations continues until the end of the train of impulses is reached and in this case the loop remains closed for sufficiently long to permit registrations to appear in each of the second to fourth areas of the instruction block representing a count of 7 and hence at the speed assumed, an interval of about 120 m. secs. In these circumstances, on the next operation of the memory circuit M12 it is not reset by coincidence circuit SL, TX1 but remains operated until position 5 of the instruction block is reached. Since there is a registration in this area the conditions are established for the operation of memory circuit M13 over the coincidence circuit M12, SL, TX5, TY1. M13 thereupon writes a dot into the first area of the digit block concerned which is the first one encountered after the instruction block having no such dot registered already. M13 is then reset over SL, TX1 at the beginning of the next digit block or over TX1, TY13 if the block concerned is the last. The purpose of this busy marking is to ensure that on the receipt of the next impulse which belongs to a succeeding train, this impulse is written into the storage area of the succeeding digit block. This is brought bout because the busy marking prevents the operation of M12 over M11, SL, TX1 until the reading head encounters the succeeding block.

If however the subscriber has abandoned the call during dialling, the timing operation will fill positions 2–4 of the instruction block at a time when his loop will be open so that there will be potential on lead PA rather than lead PA and there will be no registration in area 5 of the instruction block. Hence again position 5 of the instruction block is reached without memory circuit M12 being reset but in this case memory circuit M13 cannot be operated and the coincidence circuit M12, PA, TX5, TY1 effects the operation of memory circuit M14. This applies the erase signal to all the digit blocks of that group and is then reset over TX1, TY1 at the beginning of the next group. During the period of this operation it also applies potential to lead RL which extends to suitable equipment for effecting the release of the connection.

During conversation, the loop remains steadily closed and as was the case before dialling started, memory circuit M12 is intermittently operated and effects cycles of counting in positions 2, 3 and 4 of the instruction block.

When the subscriber hangs up, memory circuit M11 is operated and clears the instruction block and is reset over TX1, TY13. On the succeeding scan, memory circuit M12 is operated and starts a normal timing operation. When positions 2, 3 and 4 of the instruction block are full, memory circuit has not been reset by the time position 5 is reached. Consequently conditions are established for operating memory circuit M14 which effects release as previously described.

It will be appreciated that with the circuits shown the cyclic operation of memory circuit M12 will take place also when the line concerned is not in use for a telephone connection.

I claim:

1. In an electrical signalling system, a writing head, an endless magnetic recording surface, means for moving said surface past said writing head at an accurately-controlled constant speed, a signalling line, means for intermittently opening and closing said line, means for testing the open or closed condition of said line at intervals determined by the speed of movement of said surface past said writing head and means including said writing head and responsive to comparison of the results of successive tests on said line for effecting a registration on successive portions of the strip of said surface co-operating with said writing head in accordance with the number and grouping of the interruptions of said line dependent on comparison of the results of successive tests on said line.

2. In a telephone system, a magnetic drum, means for rotating said drum at an accurately-controlled constant speed, a writing head located adjacent to said drum, a telephone line, means for intermittently closing and opening a loop circuit extending over said line, means for testing the open or closed condition of said loop circuit at a speed synchronised with the speed of rotation of said drum means including said writing head for effecting a registration on successive portions of the strip of said drum co-operating with said writing head each time successive tests on said line detect a change from closed to open condition and means including said writing head for effecting a timing operation each time the results of successive tests on said line are found to be the same.

3. In a telephone system, a magnetic drum, means for rotating said drum at an accurately-controlled constant speed, a writing head located adjacent to said drum a telephone line, means for intermittently closing and opening a loop circuit extending over said line, means operative at a speed synchronised with the rotation of said drum for periodically testing the open or closed condition of said loop circuit and means for effecting a numerical registration on successive portions of the strip of said drum co-operating with said writing head in accordance with the number and grouping of the interruptions of said line.

4. In a telephone system, a magnetic drum, means for rotating said drum at an accurately-controlled constant speed, a telephone line, means for intermittently closing and opening a loop circuit extending over said line, means operative at a speed synchronised with the rotation of said drum for periodically testing the open or closed condition of said line and means for registering in code on a circumferential track extending round said drum the total number of successive openings of said loop which occur at intervals of less than a predetermined value.

5. In a telephone system, a magnetic drum, means for rotating said drum at an accurately-controlled constant speed, a telephone line, means for opening and closing a loop circuit extending over said line, a timing device, means for setting said timing device in operation responsive to the opening of said loop, means for resetting said timing device and again setting it in operation to commence a new timing operation responsive to the succeeding closing of the loop, means for resetting said timing device and again setting it in operation responsive to the succeeding opening of the loop and means for effecting a numerical registration in code on a circumferential track extending round said drum of the total number of successive openings followed by subsequent closings of said loop which occur at intervals less than the time required for said timing device to complete its operation.

6. In a telephone system, a magnetic drum, means for rotating said drum at an accurately-controlled constant speed, a telephone line, means for closing and opening a loop circuit extending over said line, means responsive to each successive opening and closing of said loop for adding one unit to a numerical registration on a circumferential track extending round said drum, a timing device, means for setting said timing device in operation responsive to each opening of said loop, means for resetting said timing device and again setting it in operation responsive to each subsequent closing of the loop, means for registering in one portion of said track the total number of said openings which occur without an intervening period of closure greater than the period of said timing device and means for registering in a different portion of said track the total number of openings of said loop which occur after a period of closure greater than the period of said timing device.

7. In a telephone system, a magnetic drum, means for rotating said drum at an accurately-controlled constant speed, a telephone line, means for closing and opening a loop circuit extending over said line, means responsive to each successive opening and closing of said loop for adding one unit to a numerical registration on a circumferential track extending round said drum, a timing device, means for setting said timing device in operation responsive to each opening of said loop, means for resetting said timing device and again setting it in operation responsive to each subsequent closing of the loop, means for registering in one portion of said track the total number of said openings which occur without an intervening period of closure greater than the period of said timing device, means responsive to the timing device operating fully without a further opening of said loop taking place for registering a control marking adjacent the registration of said total number of openings, and means controlled by said marking and responsive to subsequent openings and closings of said loop for causing the total number of said subsequent openings which occur at intervals less than the period of said timing device to be registered in a different portion of said track.

8. A telephone system as claimed in claim 3, in which the period between successive tests on any one line is approximately half the duration of the shortest period intended to elapse between changes of line condition.

9. A telephone system as claimed in claim 2, in which the timing operation is effected by adding one unit to a numerical registration each time a test is effected, erasing said registration when the results of successive tests are different and effecting a switching operation if and when the registration reaches a predetermined value.

10. A telephone system as claimed in claim 3, in which each successive opening and closing of the loop circuit effects the addition of one unit to said numerical registration.

11. A telephone system as claimed in claim 10, in which the numerical registration is effected in binary code.

12. A telephone system as claimed in claim 11, in which the addition of one unit to said numerical registration is effected by reversing the existing registration in successive positions of the binary storage group until a 0 has been changed to a 1.

References Cited in the file of this patent

UNITED STATES PATENTS

| | | |
|---|---|---|
| 2,679,551 | Newby | May 25, 1954 |
| 2,700,148 | McGuigan et al. | Jan. 18, 1955 |
| 2,738,382 | Brooks et al. | Mar. 13, 1956 |

FOREIGN PATENTS

| | | |
|---|---|---|
| 684,079 | Great Britain | Dec. 10, 1952 |

OTHER REFERENCES

Bell Telephone System Monograph No. 2151 (also published in Proceedings of the IRE, vol. 41, pages 1341–1347, October 1953).